US008818353B2

(12) United States Patent
Kuppusamy

(10) Patent No.: US 8,818,353 B2
(45) Date of Patent: Aug. 26, 2014

(54) OPTIMIZING MOBILE USER DATA STORAGE

(75) Inventor: Palanivel Kuppusamy, Plano, TX (US)

(73) Assignee: Ipinion, Inc., Plano, TX (US)

( * ) Notice: Subject to any disclaimer, the term of this patent is extended or adjusted under 35 U.S.C. 154(b) by 0 days.

(21) Appl. No.: 13/492,189

(22) Filed: Jun. 8, 2012

(65) Prior Publication Data

US 2013/0331089 A1    Dec. 12, 2013

(51) Int. Cl.
H04W 4/00 (2009.01)

(52) U.S. Cl.
USPC ......... 455/422.1; 370/328; 370/338; 375/219

(58) Field of Classification Search
USPC ........ 455/522, 524, 12.1, 517, 439, 450, 466, 455/62, 560, 422.1; 370/335, 342, 208, 370/315, 328, 338; 342/457, 450; 375/146, 375/150, 143, 139, 219; 380/34
See application file for complete search history.

(56) References Cited

U.S. PATENT DOCUMENTS

| 5,920,592 | A  * | 7/1999  | Tanaka et al. ........... 375/220 |
| 6,745,011 | B1   | 6/2004  | Hendrickson et al. |
| 2006/0101204 | A1 * | 5/2006  | Bao ..................... 711/114 |
| 2007/0183352 | A1 * | 8/2007  | Muhammad et al. ..... 370/312 |
| 2007/0276984 | A1 * | 11/2007 | Schuessler .............. 711/100 |
| 2011/0060771 | A1   | 3/2011  | Llorente et al. |
| 2011/0099048 | A1   | 4/2011  | Weiss et al. |
| 2011/0145153 | A1 * | 6/2011  | Dawson et al. ........... 705/80 |
| 2011/0295551 | A1   | 12/2011 | Rasanen et al. |
| 2011/0307573 | A1 * | 12/2011 | Lingafelt et al. ......... 709/217 |
| 2012/0072263 | A1   | 3/2012  | Dusig et al. |
| 2012/0106331 | A1   | 5/2012  | De Pasquale et al. |
| 2012/0136902 | A1 * | 5/2012  | Oyarzabal et al. ....... 707/802 |
| 2012/0142321 | A1   | 6/2012  | Steenbakkers |
| 2013/0311612 | A1 * | 11/2013 | Dickinson ............... 709/219 |

OTHER PUBLICATIONS

International Search Report and Written Opinion issued for PCDUS2013/045039, dated Aug. 15, 2013, 9 pages.

* cited by examiner

*Primary Examiner* — Mahendra Patel
(74) *Attorney, Agent, or Firm* — Fulbright & Jaworski LLP

(57) ABSTRACT

Systems and methods described herein provide a mechanism for optimizing the reception and storage of mobile user data. Data relating to mobile user location, behavior, and profiles are received from mobile users and stored at a storage system in an efficient manner. The efficiency is achieved by identifying what system parameters may be adjusted to reduce storage requirements while still providing sufficient data for useful analysis. System parameters that may change to reduce storage requirements include, e.g., the type of mobile user data collected, the frequency at which mobile user data is collected, the events or conditions that trigger data collection, and dynamically adjusting data collection upon detecting a number of event or time-based triggers.

34 Claims, 3 Drawing Sheets

OPTIMIZING MOBILE USER DATA STORAGE

CROSS-REFERENCE TO RELATED APPLICATIONS

This patent application is related to commonly assigned, co-pending U.S. patent application Ser. No. 13/492,158, filed Jun. 8, 2012 and entitled "OPTIMIZING MARKET RESEARCH BASED ON MOBILE RESPONDENT LOCATION", commonly assigned, co-pending U.S. patent application Ser. No. 13/492,170, filed Jun. 8, 2012 and entitled "OPTIMIZING MARKET RESEARCH BASED ON MOBILE RESPONDENT BEHAVIOR", and commonly assigned, co-pending U.S. patent application Ser. No. 13/492,213, filed Jun. 8, 2012 and entitled "OPTIMIZING MARKET RESEARCH USING INDICIA-BASED MOBILE RESPONDENT DATA", the disclosures of which are incorporated by reference herein in their entirety.

TECHNICAL FIELD

This disclosure is generally directed to a system and method for storing received data and to systems and methods for optimizing data received from mobile users within a wireless network.

BACKGROUND

Analyzing mobile user data may be useful for a number of purposes. Generally, when more mobile user data is received and stored for analysis, more insight is provided as to the mobile user's activities, experiences, preferences, and the like. However, receiving and storing such large amounts of data comes at a price. Storing additional data increases power consumption, cooling requirements, noise, administrative costs, disaster and data recovery costs, backup management costs, and on and on. As such, a need exists for a system that may store enough mobile user data to gain meaningful insight to mobile user activities, experiences, preferences, and the like, while avoiding undue burden in storing the data.

SUMMARY

According to an embodiment, methods and systems are provided for conducting mobile user market research. A mobile user data storage system receives and stores data from mobile users according to a first scheme. The mobile user data storage system establishes a new data receiving and storage scheme. Data received and stored from mobile users according to the new scheme requires storing less data than received from mobile users according to the first scheme.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE FIGURES

For a more complete understanding of the present disclosure, reference is now made to the following descriptions taken in conjunction with the accompanying figures, in which.

DETAILED DESCRIPTION

Systems and methods described herein provide a mechanism for optimizing the reception and storage of mobile user data. Data relating to mobile user location, behavior, and profiles is received from mobile users and stored at a storage system in an efficient manner. The efficiency is achieved by identifying what system parameters may be adjusted to reduce storage requirements while still providing sufficient data for useful analysis. System parameters that may change to reduce storage requirements include, e.g., the type of mobile user data collected, the frequency at which mobile user data is collected, the events or conditions that trigger data collection, and dynamically adjusting data collection upon detecting a number of event or time-based triggers.

Figure 1:
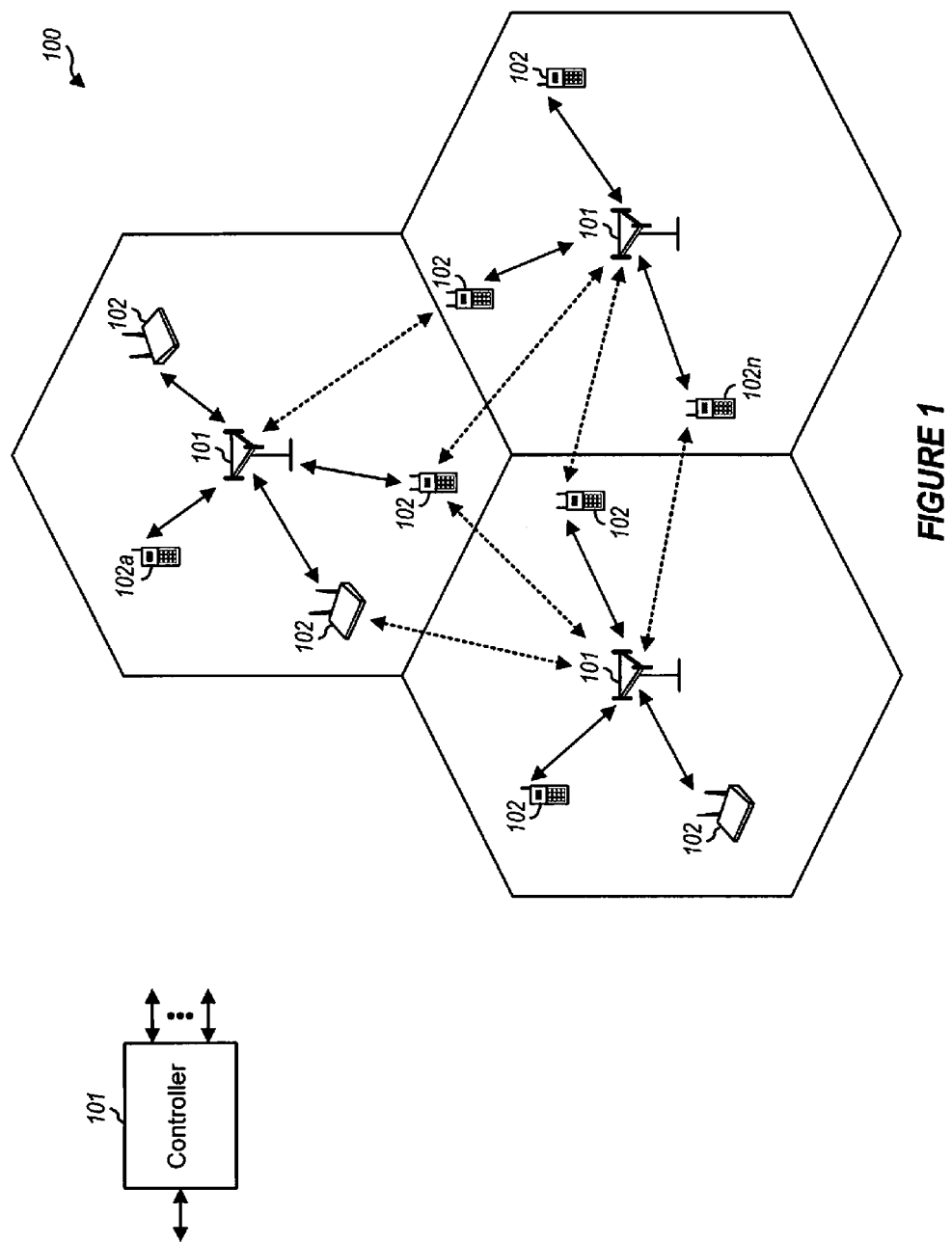
FIG. 1 illustrates a network in which concepts described herein may be implemented.

FIG. 1 illustrates network 100 in which concepts described herein may be implemented. Mobile user data storage system 101 is in communication with a plurality of mobile devices 102a-102n. Mobile user data storage system 101 is shown as a distributed network, having a plurality of base stations/eNodeBs that coordinate with one another to perform operations described herein. However, it will be understood by those of skill in the art that all or portions of mobile user data storage system 101 will comprise a centralized location (perhaps one of a base station/eNodeB, a controller, or enterprise location) to enable the operations. As will be further described, mobile user data storage system 101 communicates with mobile devices 102, receives mobile user data (e.g., location data, behavioral data, and profile data) and optimizes storage of that data. Specifically, mobile user storage system 101 determines a scheme to store a sufficient amount of mobile user data to gain meaningful insight as to the user's activities, experiences, preferences, and the like, while avoiding storage of an undue amount of that mobile user data. According to one embodiment, mobile user data storage system 101 may be a market research enterprise that focuses on conducting market research on mobile users or mobile users using mobile devices 102.

Network 100 may be implemented using a number of wireless communication methods between mobile user data storage system 101 and mobile devices 102 and wireless and/or wireline communication methods between mobile user data storage system 101 and mobile devices 102. Such wireless methods include CDMA, TDMA, FDMA, OFDMA, SC- FDMA. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies described above, as well as other wireless networks and radio access technologies. According to a preferred embodiment, mobile user data storage system 101 communicates with mobile devices 102 using LTE or LTE-A wireless communication methods.

Figure 2:
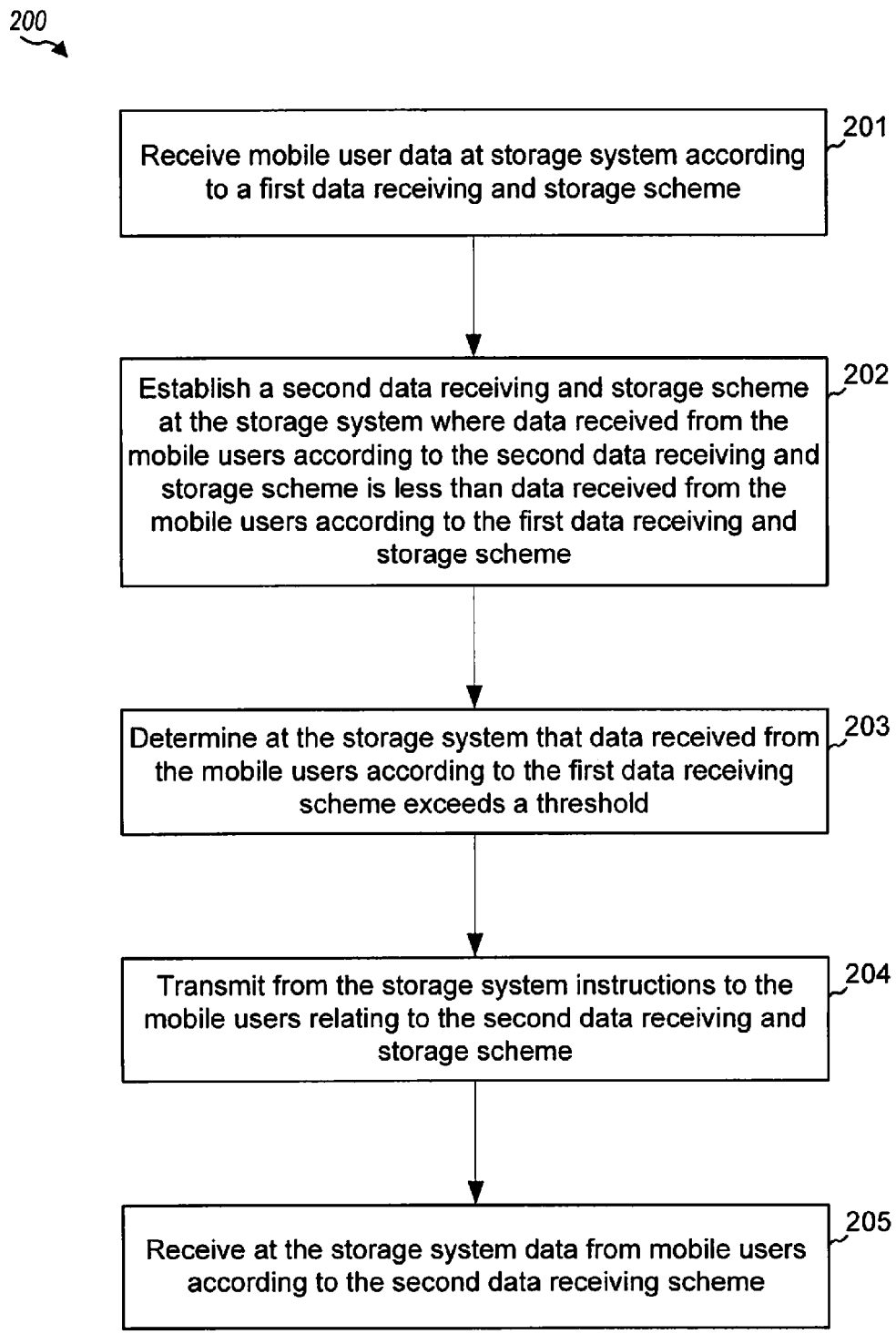
FIG. 2 illustrates functional blocks executed to perform a method of mobile user market research according to the concepts described herein.

FIG. 2 illustrates functional blocks executed to perform a method of mobile user market research according to the concepts described herein. Specifically, FIG. 2 illustrates functional blocks executed by a storage system such as mobile user data storage system 101 illustrated at FIG. 1.

At block 201 the storage system receives data from mobile users according to a first data receiving scheme. As described herein, a data receiving scheme may involve the type of data collected or received from mobile users (e.g., location, behavioral, profile, etc.), the frequency at which data is collected (e.g., one per hour, once per day, etc.), events or conditions that trigger receiving data (e.g., where the mobile user crosses a virtual radius about a given location, launches an application or other software, powers on a mobile device, etc.), varying data collection rates based on various parameters (e.g., during periods of expected activity, detection of location, etc.), and/or the format of received data (e.g., GPS-type, address, latitude/longitude, etc.).

Commonly, a data receiving scheme requires an understanding of mobile user location, whether it be past, current, or predicted location. As such, mobile user data storage system 101 implements mechanisms for collecting and storing mobile user location data in an efficient way. According to one embodiment, mobile user data storage system 101 monitors the location of each mobile device 102 via a mechanism similar to that utilized by common cellular networks, where a location of each mobile device 102 is resolved by triangulation techniques and the like by base stations serving the cell in which mobile device 102 currently resides. According to an another embodiment, mobile user data storage system 101 may utilize specific location-based communications transmitted from mobile devices 102. Where mobile devices 102 implement GPS-type functionality, each mobile device 102 may transmit GPS data to mobile user data storage system 101 which uses that data to launch a storage application as described herein. It should be appreciated that determining a location of a mobile device 102 using either a network-based method (for example, base station/eNodeB triangulation, network statistics data, etc.) or specific location data transmitted from mobile device 102 is a trade off. Relying upon specific location data transmitted from mobile devices 102 may provide more accurate and more up-to-date data; however, it also requires more power from mobile devices 102, more storage space at mobile user data storage system 101, and is computationally intensive.

It should be appreciated that storing location data for mobile devices 102 and their corresponding users may be unduly burdensome on mobile user data storage system 101. Even where the location data of mobile devices 102 is basic, the cumulative volume of stored data per time interval per mobile device 102 may be relatively large. This causes difficulties both in terms of physical and computational resources. Therefore, according to one embodiment a mechanism for reducing storage requirements of data relating to mobile users may be implemented at mobile user data storage system 101. Mobile user data storage system 101 contains software and/or hardware supporting a decision-making process where mobile user data storage system 101 will change the format of received data to save storage space thereat. For example, during period of high mobile user traffic, dense data communications, and the like, mobile user data storage system 101 may collect only raw data to minimize storage requirements. On the other hand, where a higher level of insight may be required for a particular user (e.g., knowing mobile user location with a high degree of accuracy, comparing location to other locations of interest, etc.), mobile user data storage system 101 may instruct mobile devices 102 to transmit richer data such as GPS-type data.

According to an additional or alternative embodiment, mobile user data storage system 101 may collect location data for each mobile user at predetermined time intervals and store the location of the mobile user for subsequent comparison to locations of interest. Of course, the frequency at which location data is collected will affect the accuracy at which it can be determined whether a mobile user came within proximity of a location of interest. This must be balanced against the additional storage and computational requirements associated with collecting location data at a higher frequency. The frequency at which mobile user location data is collected for storage may vary according to different mechanisms, depending on system requirements, mobile user preferences, storage applications, and the like. Some storage applications such as storing mobile user responses to surveys based on movies may require a lower collection frequency as the event of interest occurs over a relatively long period of time, whereas storage applications such as storing mobile user response to surveys based on a fast food restaurant may require higher frequency collection as the event of interest typically lasts only a few minutes. Further, the frequency at which mobile user location data is collected may vary according to day of week, time of day, etc., where expected periods of inactivity require very little data collection.

In real-time applications, the frequency at which location data is collected for a mobile user may vary according to the mobile user's actual location. Where a mobile user is determined to be within a proximity of a location of interest, the interest in user behavior and/or available market research is heightened. The frequency at which location data is collected may increase to track more precise user movement at or near a location of interest. Where, for example, a user is determined to be in Wal-Mart (location of interest), an increase in collection of location data may enable a determination of the specific section or aisle within the Wal-Mart at which the mobile user is located. Subsequent or refined storage applications may be implemented at system 101 and instructions relating to a new or refined data receiving scheme may be transmitted to the mobile user.

With the previous discussion in mind, a storage application and/or instructions relating to a new data receiving scheme may be transmitted to a mobile user in response to a determination that the mobile user came within proximity of a location of interest. As previously discussed, the storage application and/or instructions may be transmitted at or near real-time with a determination the mobile user is within a proximity of a location of interest, may be transmitted after the mobile user has been within a proximity of a location of interest, or transmitted based upon a determination or prediction the mobile user will soon be in proximity to a location of interest. Further, the determination of what proximity causes transmission of the storage application may be determined by mobile user data storage system 101, and may vary according to different mechanisms, depending on mobile user and system requirements, a given storage application, system limitations, and the like. For example, some storage applications may be initiated where a mobile user has come within a mile of a location of interest, while other applications may be initiated where the mobile user has come within 20 feet of a location of interest. Further, the proximity of interest may be provided by a user of mobile user data storage system 101, or generated by mobile user data storage system 101 upon a formulation of what proximity of interests are thought to satisfy the system objectives.

Further, where a user of mobile user data storage system 101 desires to target specific mobile users who travel within a proximity of a location of interest, mobile user data storage system 101 may overlay profile data of a mobile user to further restrict which mobile users receive a storage application or instructions to transmit data according to a new data receiving scheme implemented at mobile user data storage system 101. For example, where a market research enterprise controlling or directing system 101 is interested in initiating a data receiving scheme only for males between the ages of 18-35 who shop at Wal-Mart, mobile user data storage system 101 may narrow all results of mobile users coming within the proximity of interest of one or more Wal-Mart stores by discarding all mobile users who are female and outside of the specified age range. In this way, mobile user data storage system 101 uses mobile user profile data stored thereat to further optimize storage requirements at mobile user data storage system 101.

An embodiment implements one or a combination of techniques to determine the location of a mobile user utilizing a mobile device 102 with respect to a location of interest. One such technique involves receiving locations of interest or generating locations of interest at mobile user data storage system 101. Once the locations of interest are determined, a virtual radius or fence may be drawn around the locations of interest. Using software executing at both mobile devices 102 and mobile user data storage system 101, a determination may be made as to which mobile users come within the radius or fence around the locations of interest. For example, at mobile user data storage system 101, location data from mobile devices 102 may be compared to the location defined by the radius or fence. Those mobile devices determined to have crossed the radius or fence are determined to be in proximity of the location of interest. As a result, subsequent or refined storage applications may be implemented at system 101 and instructions relating to a new or refined data receiving scheme may be transmitted to the mobile user based on that location. According to an embodiment, a mobile user determined to have crossed a radius or fence is sent a storage application and/or instructions relating to a new or refined data receiving scheme in or near real-time, using mechanisms such as push messages, text messages, SRS messages, emails, etc., leading the mobile user to the storage application.

Another technique exploits mobile user location in combination with features specific to different locations to initiate a mobile storage application and/or data receiving scheme. According to such a technique, various businesses or enterprises perhaps differing in industry, services, and products may be spread across several locations. Mobile user data storage system 101 may track or import locations of each business and various storage applications associated with the businesses. In that case, when a mobile user comes within a proximity of any number of different types of businesses, the mobile user is alerted as to different services, advertisements, market research offers, etc., offered for each business. The mobile user may be alerted that, by participating in different surveys and the like for the various businesses, he/she will be eligible for various offers.

Yet another technique involves storing a history of mobile user locations and subsequently comparing those locations to locations of interest. This technique is advantageous because it is less computationally-intensive and does not require real-time monitoring of mobile users. Further, this technique still provides a meaningful amount of mobile user location data because it allows a system user to reach users who have had particular experiences in the near past.

Mobile user data storage system 101 also stores user profile data and may vary the reception and storage of such data according to the previous discussion relating to mobile user location data. When creating and expanding a mobile user database, initial data is collected from each user. The initial data may comprise data used to create an initial profile such as demographic data, employment and lifestyle data, preference data, user preferences, hobbies, general interests, etc. The data may be updated from time to time upon a request for updates transmitted to the user, or proactively by the user. This data may be compiled to generate user profiles that are relied upon to generate locations of interest and/or target specific users for market research applications.

Further, mobile user data storage system 101 also stores user behavioral data and may vary the reception and storage of such data according to the previous discussion relating to mobile user location data. Behavioral data such as internet history, applications downloaded and utilized the most, text message use vs. phone use, etc., may be collected to further refine a data receiving and storage scheme. In either event the profile and behavioral data may be used to refine a data receiving and storage scheme according to the concepts described herein. A mechanism for passively and actively collecting mobile user behavioral data to initiate market research applications is described in a related, commonly assigned, co-pending U.S. patent application Ser. No. 13/492, 170, filed Jun. 8, 2012 and entitled "OPTIMIZING MARKET RESEARCH BASED ON MOBILE RESPONDENT BEHAVIOR," the disclosure of which is incorporated by reference herein in its entirety.

At block 202 the storage system establishes a second data receiving scheme where data received from the mobile users according to the second data receiving scheme is less than data received from the mobile users according to the first data receiving scheme. A second data receiving scheme may be thought of as a refinement of a previous mobile user data receiving scheme. Refining the data receiving scheme may be accomplished by utilizing data collected during a first scheme and/or in response to determining an amount of data collected and subsequently stored according to the first scheme is undesirable high. As a result, the frequency at which location, behavioral, and or profile data is collected may decrease as a default and increase only in response to a determination that the user is in proximity to a location of interest, a period of expected high activity begins, etc.

Establishing a second data receiving scheme may be implemented in a number of different ways according to the concepts described herein. Mobile user data storage system 101 may vary the frequency at which data is received from the mobile users where, e.g., less data is received from the mobile users during periods of expected low mobile user activity. Additionally, more data may be received from the mobile users only during periods of expected high mobile user activity. Further, mobile user data storage system 101 may vary the frequency at which data is received from the mobile users by increasing the frequency at which data is received from the mobile users only during period when a mobile user is determined to be in a proximity of a location of interest. According to an embodiment, mobile user data storage system 101 may vary the frequency at which data is received from mobile users by receiving data from the mobile users only upon the occurrence of an event or condition. Such events or conditions may include, e.g., powering on a mobile device, rebooting a mobile device, a mobile user crossing a virtual radius of a location of interest, etc. According to another embodiment, mobile user data storage system 101 may elect to collect only a particular type of mobile user data. For example, mobile user data storage system 101 may decide to receive only mobile user behavioral data or mobile user location data.

According to the previously discussed example using these concepts, a storage application and/or instructions relating to a new data receiving scheme may be transmitted to the mobile user upon a determination the user has entered a location of interest, e.g. Wal-Mart (for example, a survey based on the user's shopping experience). However, a second, refined storage application and/or instructions relating to a new data receiving scheme may be transmitted to the mobile user upon a determination the user is at a particular location within the Wal-Mart (for example, a survey relating to a product, display, or layout on a specific aisle). The storage application and data receiving scheme may be further refined according to the length of time a user is determined to be at a particular location of interest and/or response data previously received from the mobile user. Also, consistent with the previous discussion, a refined a storage application and/or instructions relating to a new data receiving scheme may be transmitted to a user based upon that user's profile data and/or behavioral data.

At block 203 mobile user data storage system 101 determines data received from the mobile users according to the first data receiving scheme exceeds a threshold. Further, mobile user data storage system 101 may determine a degree to which the collected data exceeds the threshold. Depending on these determinations, mobile user data storage system 101 may change a number of data receiving and storage parameters to implement a data receiving and storage scheme to bring the amount of received and stored data below the threshold.

At block 204 the storage system transmits instructions to said mobile users relating to said second data receiving scheme. The transmitted instructions comprise signals sufficient to enable a mobile device, such as mobile device 102 illustrated in FIG. 1, to adjust its operating parameters to transmit data according to the new scheme implemented by mobile user data storage system 101. Upon receiving the instructions, a mobile device may implement changes in how it collects and transmits user data by executing instruction in an application or other piece of software installed on the mobile device.

At block 205 the storage system receives data from mobile users according to the second data receiving scheme. According to the concepts described herein, the amount of storage should be reduced while still being sufficient to provide meaningful insight to mobile user activity, experiences, preferences, and the like.

It should be appreciated that the functions performed with reference to FIG. 2 may be iterative where, e.g., an updated or revised market research application is transmitted to a mobile device based on updated information received from the mobile device. The updated information may comprise new behavioral data, new market research data, and new location data. Through this iterative process, a market research enterprise can incrementally refine its market research applications to provide more relevant applications to respondents.

Figure 3:
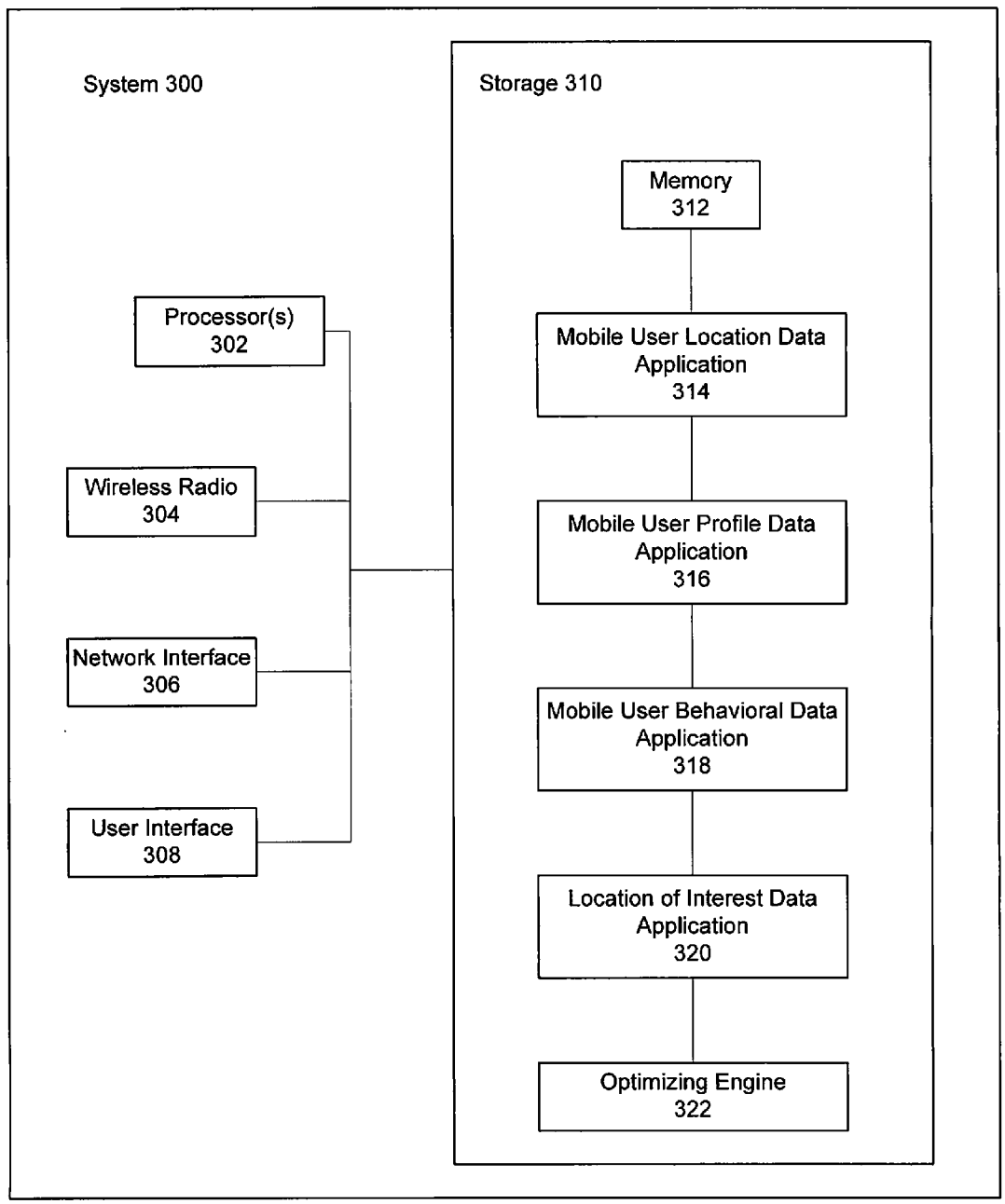
FIG. 3 illustrates functional blocks of components of an apparatus for mobile user market research according to the concepts described herein.

FIG. 3 illustrates a block diagram of components of an apparatus that enables mobile user market research according to the concepts described herein. Specifically, FIG. 3 illustrates components of a storage system such as mobile user data storage system 101 illustrated at FIG. 1. Each component may comprise hardware, software, firmware, program code, or other logic (for example, ASIC, FPGA, etc.), as may be operable to provide the functions described herein.

The functionality and operations of storage system 300 are controlled and executed through processor(s) 302. Processor(s) 302 may include one or more core processors, central processing units (CPUs), graphical processing units (GPUs), math co-processors, and the like. Processor(s) 302 execute program logic, whether implemented through software stored in a memory 312 or in firmware in which logic is integrated directly into integrated circuit components. Storage system 300 may communicate wirelessly with multiple client systems and mobile devices through various radios, such as wireless radio 304, such as one or more of wireless wide area network (WWAN) radios and wireless local area network (WLAN) radios. If a WWAN radio is included as one of the radios in wireless radio 304, communication would generally be allowed over a long range wireless communication network such as an LTE network. Storage system 300 may also provide communication and network access through a wired connection with network interface 306. The wired connection may connect to the public-switched telephone network (PSTN), or other communication network, in order to connect to the Internet or other accessible communication network.

Storage system 300 comprises storage 310, which includes memory 312, mobile user location data 314, mobile user profile data application 316, mobile user behavioral data application 318, location of interest data application 320, and optimizing engine 322. Under control of processor(s) 302, program logic stored on memory 312, including mobile user location data application 314, mobile user profile data application 316, mobile user behavioral data application 318, location of interest data application 320, optimizing engine 322, and other applications provides functionality of storage system 300, including communications, storage, computation, and filtering, analysis, and correlation of location data, profile data, and location of interest data. Such operating applications may be displayed visually to the user via user interface 308. User interface 308 includes various hardware and software applications that control the rendering of visual data onto the display screen of computers of storage system 300 (not shown). User interface 308, under control of the processor(s) 302, controls and operates all forms of interfaces between the user and storage system 300. As such, when storage system 300 is implemented using a touch screen display, user interface 308 may read the user's input and finger motions on the touch screen and translate those movements or gestures into electronic interface navigational commands and data entry. Various embodiments of user interface 308 also will receive the rendered visual data through processing, controlled by processor(s) 302, and display that visual data on the display. During input to a touch screen device, the user interface 308 may be receiving and analyzing input data from a user's finger movements and gestures on the display screen.

Mobile user location data application 314, mobile user profile data application 316, mobile user behavioral data application 318, location of interest data application 320, and optimizing engine 322 may be interfaced with one another to configure the processor(s) 302 to receive various types of data from mobile users for various operations described with reference to FIG. 2. Optimizing engine 322 may be interfaced with mobile user location data application 314, mobile user profile data application 316, mobile user behavioral data application 318, and location of interest data application 320 to compile, analyze, correlate and/or filter the data as needed. Optimizing engine 322 may further execute instructions to determine how the reception and storage of data should be modified in order to reduce storage requirements at mobile user data storage system 101. Optimizing engine 322 may further operate to configure processor 302 to modify operations performed by each application to execute those changes. As previously discussed, optimizing engine 322 may determine what changes are required to sufficiently decrease mobile user data reception and storage by comparing previously-received/previously-stored data to a threshold, preferred range, user preferences, and the like.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for optimizing mobile user data storage by adjusting parameters, said method comprising:

receiving, at a storage system, data from one or more mobile users according to a first data receiving scheme;

establishing, at said storage system, a second data receiving scheme according to a location of said one or more mobile users where the frequency at which data is received from said mobile users according to said second data receiving scheme is different than the frequency at which data is received from said mobile users according to said first data receiving scheme, wherein
more data is received from said one or more mobile users when said one or more mobile users is determined to be in a proximity of a location of interest, and
less data is received from said one or more mobile users during periods of expected low mobile user activity and more data is received from said one or more mobile users during periods of expected high mobile user activity; and
instructing said one or mobile users to transmit data to said storage system according to said second scheme.

2. The method of claim 1 further comprising:
determining data received from said one or more mobile users according to said first data receiving scheme exceeds a threshold.

3. The method of claim 2 further comprising:
transmitting, from said storage system, instructions to said one or more mobile users relating to said second data receiving scheme.

4. The method of claim 3 further comprising:
receiving data from said one or more mobile users according to said second data receiving scheme.

5. The method of claim 1 wherein said data comprises mobile user location data.

6. The method of claim 5 wherein said data comprises mobile user behavioral data.

7. The method of claim 6 wherein said data comprises mobile user profile data.

8. The method of claim 1 wherein said establishing said second receiving scheme further comprises varying the frequency at which data is received from said one or more mobile users.

9. The method of claim 8 wherein varying the frequency at which data is received from said one or more mobile users comprises receiving data from said one or more mobile users only upon the occurrence of an event or condition.

10. The method of claim 9 when said event or condition comprises powering on a mobile device of said mobile user.

11. The method of claim 9 when said event or condition comprises rebooting a mobile device of said mobile user.

12. The method of claim 9 when said event or condition comprises said mobile user crossing a virtual radius of a location of interest.

13. The method of claim 1 wherein said establishing said second receiving scheme comprises collecting only mobile user behavioral data.

14. The method of claim 1 wherein said establishing said second receiving scheme comprises collecting only mobile user location data.

15. A system for optimizing storage of mobile user data by adjusting parameters, said system comprising:
at least one processor; and
a memory coupled to the at least one processor, wherein the at least one processor is configured to:
receive, at a storage system, data from one or more mobile users according to a first data receiving scheme;
establish, at said storage system, a second data receiving scheme according to a location of said one or more mobile users where the frequency at which data is received from said mobile users according to said second data receiving scheme is different than the frequency at which data is received from said mobile users according to said first data receiving scheme, wherein
more data is received from said one or more mobile users when said one or more mobile users is determined to be in a proximity of a location of interest, and
less data is received from said one or more mobile users during periods of expected low mobile user activity and more data is received from said one or more mobile users during periods of expected high mobile user activity; and
instruct said one or mobile users to transmit data to said storage system according to said second scheme.

16. The system of claim 15 wherein said processor is further configured to:
determine data received from said one or more mobile users according to said first data receiving scheme exceeds a threshold.

17. The system of claim 16 wherein said processor is further configured to:
transmit, from said storage system, instructions to said one or more mobile users relating to said second data receiving scheme.

18. The system of claim 17 wherein said processor is further configured to:
receive data from mobile users according to said second data receiving scheme.

19. The system of claim 15 wherein said processor is further configured to:
receive mobile user location data.

20. The system of claim 19 wherein said processor is further configured to:
receive mobile user behavioral data.

21. The system of claim 20 wherein said processor is further configured to:
receive mobile user profile data.

22. The system of claim 15 wherein said processor is further configured to:
increase the frequency at which data is received from said one or more mobile users only during period when a mobile user is determined to be in a proximity of a location of interest.

23. The system of claim 15 wherein said processor is further configured to:
receive data from said one or more mobile users only upon the occurrence of an event or condition.

24. The system of claim 23 when said event or condition comprises powering on a mobile device of said mobile user.

25. The system of claim 23 when said event or condition comprises rebooting a mobile device of said mobile user.

26. The system of claim 23 when said event or condition comprises said mobile user crossing a virtual radius of a location of interest.

27. The system of claim 15 wherein said processor is further configured to:
collect only mobile user behavioral data.

28. The system of claim 15 wherein said processor is further configured to:
collect only mobile user location data.

29. The method of claim 1 wherein location of said one or more mobile users is a real-time or near real-time location.

30. The method of claim 1 wherein location of said one or more mobile users is a predicted location of said one or more mobile users in relation to a location of interest.

31. The method of claim 1 wherein location of said one or more mobile users is a historical location of said one or more mobile users in relation to a location of interest.

32. The system of claim 15 wherein location of said one or more mobile users is a real-time or near real-time location.

33. The system of claim 15 wherein location of said one or more mobile users is a predicted location of said one or more mobile users in relation to a location of interest.

34. The system of claim 15 wherein location of said one or more mobile users is a historical location of said one or more mobile users in relation to a location of interest.

* * * * *